Figure 1:
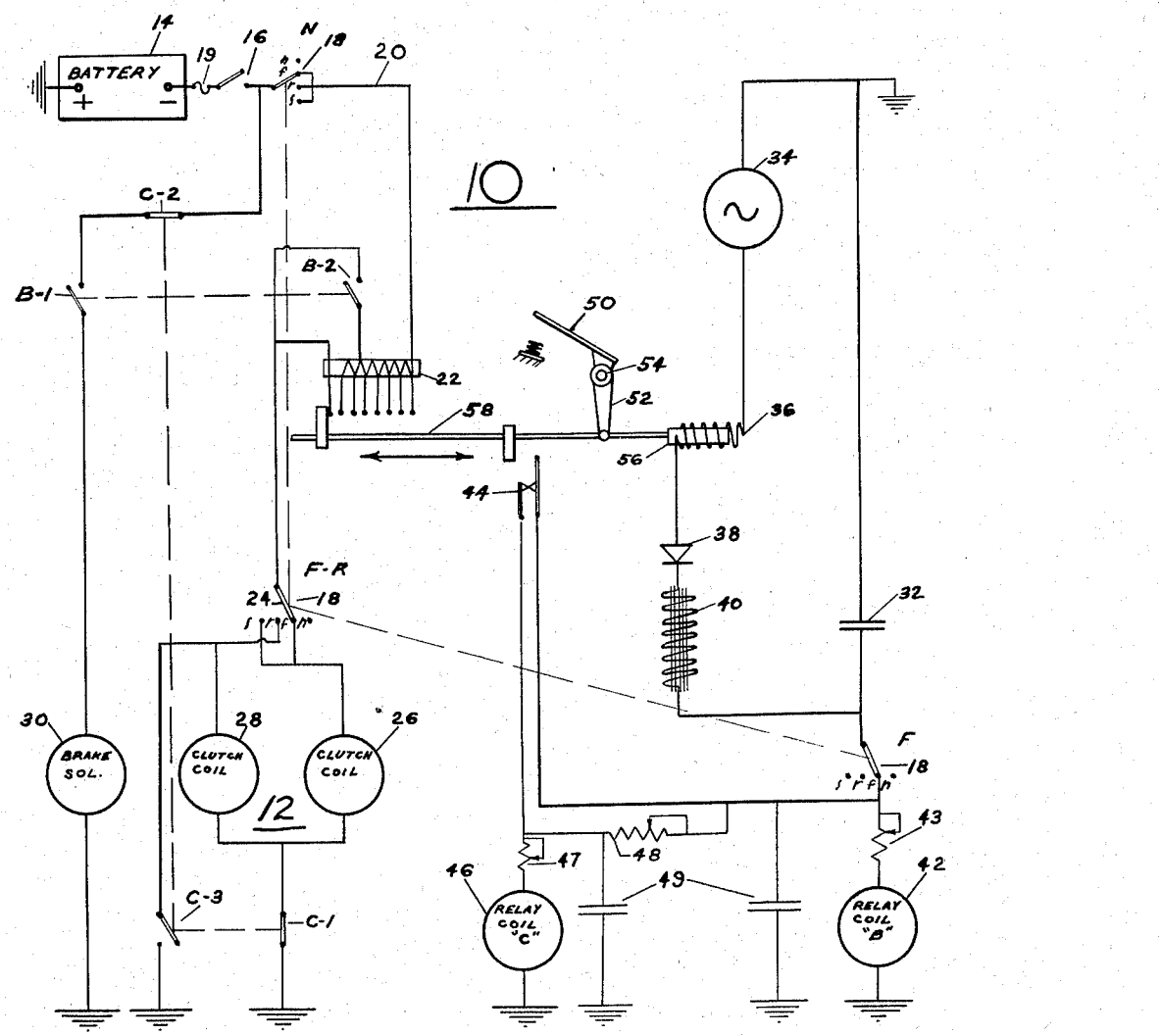

INVENTOR.
RALPH L. JAESCHKE
BY
ATTORNEYS

United States Patent Office 2,907,423
Patented Oct. 6, 1959

2,907,423

TRANSMISSION CONTROL SYSTEM

Ralph L. Jaeschke, Kenosha, Wis., assignor to Eaton Manufacturing Company, Cleveland, Ohio, a corporation of Ohio Application March 2, 1955, Serial No. 491,702

6 Claims. (Cl. 192—3.5)

This invention relates to a control system and in particular to a speed responsive system for controlling the gearing between a power drive means and a load.

Broadly the present invention comprehends the provision of a control system for an automatic transmission that enables through manipulation of a simple manual selector the conditioning or adjustment of the circuit to operate automatically in either one of three desired ranges. The circuit is effective to shift or change the gearing of the transmission to facilitate desired performance of an automobile in response to a mere variation in automobile speed or throttle position.

The present invention will be set forth and described with respect to its applicability to an automobile, it being understood, however, that its applicability readily extends to other transporting devices such as trucks or boats or even to stationary apparatus.

The present application is concerned with components operable automatically in response to the rotary speed of a propeller or drive shaft of an automobile to provide optimum gearing between a power source and a load in one condition thereof, to enable reverse rotation of the drive shaft in a second condition thereof and to provide thirdly, a condition of no drive or neutral.

An electrical signal is developed by an alternating current generator which is coupled directly to the propeller shaft and driven at a speed proportional to that of the propeller. The signal developed thereby is rectified and filtered and applied to a pair of relay solenoid coils which are sequentially responsive to the signal to close switch contacts which causes a change in gearing by the actuation of other circuit elements and mechanical apparatus of the type disclosed in Patent 2,540,639 to M. P. Winther. A modulator is provided in the signal circuit for effecting a more desirable relationship between vehicle speed and engine speed before shifting of the transmission takes place. Modulation herein is effected by variable insertion of a high permeability core in a solenoid winding connected serially with the A.C. generator output. The core is linked with the throttle pedal of the automobile so as to be inserted to a maximum depth in the coil at full throttle and to be removed from the coil at no throttle.

It is an object of the present invention to provide a control system for an automatic transmission that incorporates the following features:

a. Means for idling of the engine with the vehicle standing which provides a complete neutral position avoiding vehicle creep.

b. Throttle means facilitating smooth even acceleration from a standstill.

c. A vehicle speed sensitive signal for shifting upwardly and downwardly between transmission speeds.

d. Sufficient lag in the control steps to avoid hunting of the shifts between increasing and decreasing vehicle speeds.

e. Modulation of vehicle speeds at which the transmission shifts under the control of throttle position.

f. Means for kicking down from high speed to an intermediate speed at the will of the operator.

g. Means for operating with modulated throttle after a kickdown.

h. Means for rocking between forward and reverse speeds such as in working free from mud holes or snow.

Figure 2:
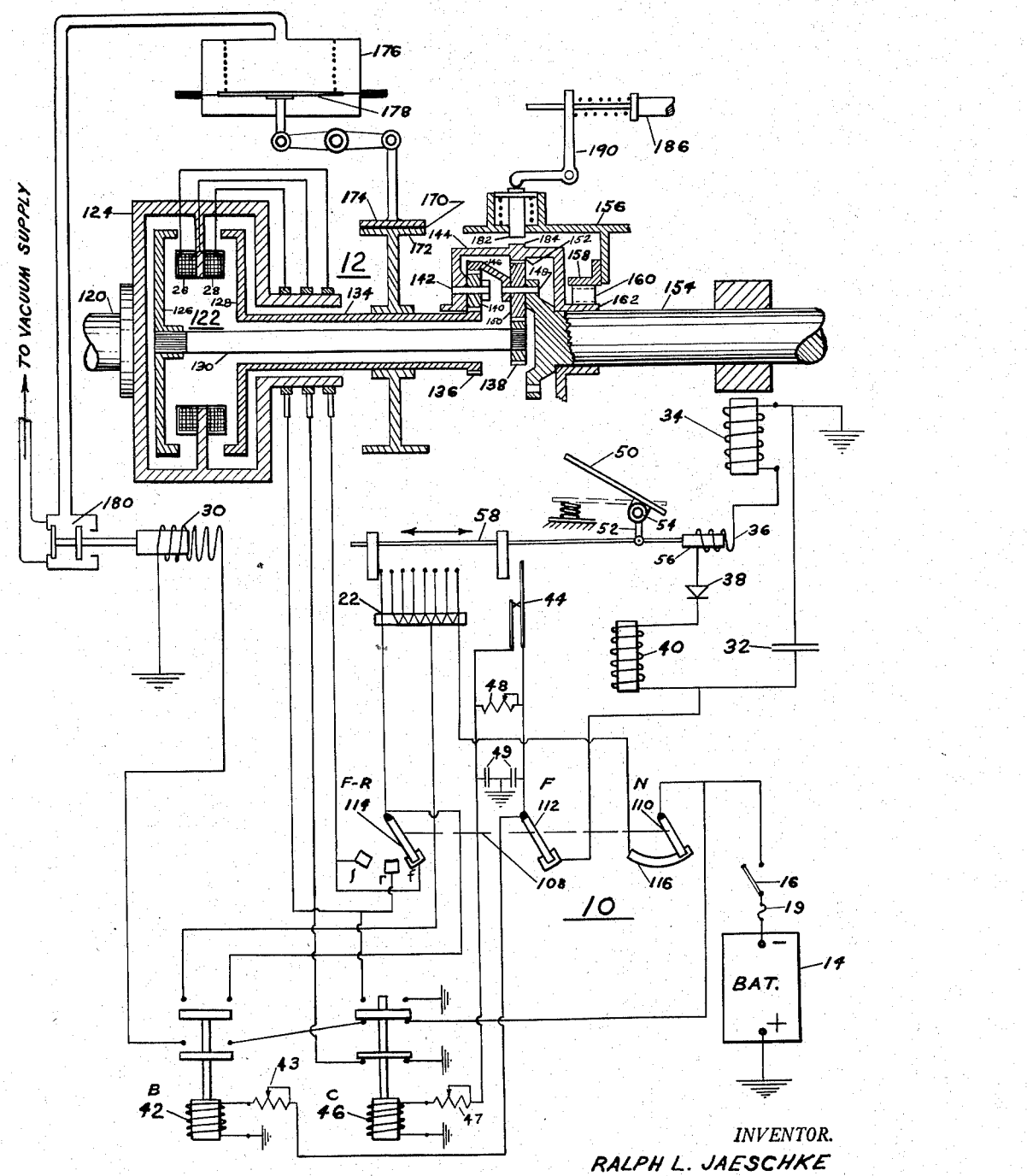

Other objects and advantages of the present invention will be manifest from a perusal of the following disclosure in connection with the accompanying drawings in which:

Fig. 1 shows a simplified line diagram of the control circuit of the present invention, and Fig. 2 shows a more detailed combined electrical schematic and mechanical diagram of one application of the present invention.

In the two figures of drawing the same reference numerals refer to identical components.

Referring now more particularly to Fig. 1 of the drawings for a detailed description of the invention, 10 represents generally the control circuit of the present invention and 12 represents generally an automatic transmission to which the circuit 10 is applicable.

In Fig. 1, 14 represents a storage battery of a type customarily employed in automotive vehicles, having one terminal thereof grounded and the other terminal connected serially with a current controlling fuse 19, the contacts of an ignition switch 16 and a section of a selector switch 18 to a line 20. A caterpillar type of variable resistance device 22, henceforth referred to as a caterpillar, is provided having one end connected to line 20 and the other end connected to the movable contact 24 of a section of selector switch 18. It is to be understood that the storage battery may be replaced by any suitable voltage source as, for example, the armature terminals of a conventional automobile generator. In the latter event, the throttle-actuated caterpillar 22 can be eliminated since the generator armature voltages vary in accordance with engine speeds and consequently generally with throttle position. The first two contacts of caterpillar 22 are unconnected in the absence of throttle deflection and contact B-2 is arranged to open the circuit of the clutch coils and prevent any tendency of the automobile to creep in idling condition. Contacts B-2, when closed, shunt a portion of caterpillar 22 to increase clutch coil energization during initial stages of acceleration. Contact 24 is selectively connectable to either of two fixed contacts $f$ or $r$. $f$ and $r$ are connected, respectively, to terminals of electromagnetic clutch coils 26 and 28, the other terminals of the coils being jointly connected to a terminal of relay C, the other terminal of which is grounded. Contact $f$ is also connectable to ground through contacts of relay C. Line 20 is also connected serially with another pair of terminals of relay C, a pair of terminals of relay B and a brake band solenoid 30 to ground. A capacitor 32 is connected between ground and a wiper terminal of selector switch 18. In parallel with capacitor 32 is a series circuit including an alternating current generator 34, an acceleration modulator reactor 36, a rectifier 38 and an inductive reactor 40. It is readily understood that reactor 40 may be replaced by a suitable resistor with an appropriate increase in value of capacitor 32 to maintain proper filtering action. A solenoid coil 42 of relay B is connected between one of the other terminals of switch 18 and ground. A potentiometer 43 is interposed in the latter connection for adjustment purposes to be explained later.

A "kick-down" switch 44 is provided and has one terminal connected to a terminal of relay 42 and another terminal to a first terminal of coil 46 of relay C through a potentiometer 43 for enabling along with potentiometer 47 an adjustment of the point of actuation of relays B and C, and with the second terminal of the coil 46 being grounded. An adjustable by-pass resistor 48 connected directly across the terminals of switch 44 is provided for a purpose to be set forth. A pair of similarly connected capacitors 49 are connected across respective potentiometer-relay coil circuits for delaying the response time of the relay coils. Sudden voltage changes across the coils are rendered less effective to cause consequent current changes due to the charging or discharging capacitors. A throttle pedal 50 rotatable with an arm 52 about a pivot 54 is provided for simultaneous movement of an iron core 56, insertable axially into reactor 36, and a rod 58 for effecting contact between the contacts of caterpillar 22.

The closing or opening of each pair of contacts of each of the relays B and C is effected in unison through the mechanical linkages shown dotted in the drawing. The pairs of contacts of relay B open together and close together while in relay C, one pair of contacts opens while the other two pairs close and vice versa.

The cooperation and interrelation between elements in the apparatus of Fig. 1 will be made clear from a description of the operation of the present system following a description of the apparatus in Fig. 2 of the drawings, the operation, which is, of course, entirely similar to that of the apparatus shown in Fig. 1.

In Fig. 2 the control system of Fig. 1 is shown wherein the components of selector switch 18, relays B and C, the circuitry associated therewith, and transmission 12 are shown more in detail. Selector switch 18 comprises 3 sections, viz., N section, F section and F–R section. Each section has a pivotal arm 110, 112 and 114, respectively, connected for unitary movement with the arms of the other two switches through some suitable mechanical linkage as shown by dotted line 108 and movable to one of 4 angularly spaced positions which are n, for neutral; f, for forward, r, for reverse and l, for low forward speeds. Arm 110 of section N is neutral or in open circuit with respect to any other element in first position and contacts an arcuate terminal 116 in the other three positions. Section F is connected for completion of the A.C. generator circuit for energization of relay coils 42 and 46 in second position and is in open circuit in the other three positions. Section F–R is open in first position and in the second position the fixed contact of this section is connected to one terminal of clutch coil 26 through an appropriate slip ring connection. The third position fixed contact of this section is connected to one terminal of clutch coil 26 through an appropriate slip ring connection. The third position fixed contact of this section is connected to one terminal of clutch coil 28 through an appropriate slip ring connection and the fourth position fixed contact is connected to the second position fixed contact.

Clutch coils 26 and 28 have their other ends connectable to ground through an appropriate slip ring connection and contacts C–1 of relay C.

A power source (not shown) is adapted to impart rotary motion to an input shaft 120 of an electromagnetic clutch 122 having an input member 124 and a pair of output members 126 and 128 and a respective coil for each clutch 124—126 and 124—128. Output member 126 is connected with a shaft 130 for rotation therewith and an output member 128 is connected with a quill 134 for rotation therewith. A pair of sun gears 136 and 138 forming components of a planetary gear system are mounted on shaft 130 and quill 134, respectively, for rotation therewith. A first planetary gear 140 carried by a pintle 142 which is in turn carried by rotary housing 144 is in engagement with sun gear 136. A ring gear 146 in engagement with planetary gear 140 supports a pintle 148 carrying a planetary gear 150. Planetary gear 150 engages sun gear 138 and a ring gear 152 carried by and rotary with housing 144. An output or propeller shaft 154 for driving an appropriate load (not shown) is provided and connected thereto and rotary therewith is pintle 148. A fixed housing enclosure 156 is provided and one race 158 of a one-way brake mechanism 160 is fixedly attached thereto. A second race 162 of brake 160 is secured to and rotatable with housing 144.

A brake 170 having one member 172 thereof rotatable with quill 134 and a stationary member 174 is provided for controlling rotation of quill 134 and a vacuum chamber 176 and movable diaphragm 178 are provided for controlling through a suitable linkage the engagement of brake 170. Vacuum is derived from a suitable source such as an internal combustion engine intake manifold and communication therewith is had through suitable conduits and valve 180 actuated by brake band solenoid 30. Valve 180 selectively provides communication between a vacuum source and atmosphere depending upon the position of a plunger actuated by solenoid 30.

A pawl 182 is engageable with a set of teeth 184 on housing 144 to hold it stationary and is actuated by a suitable linkage connected with a selector lever 186.

Having set forth the essential elements of the control system, the operation will now be described. It is assumed that the automobile is at standstill with the engine stalled. The engine is started by the closure of ignition switch 16 and the N section of selector switch 18 together with energization of a suitable starter means. The selector switch is then manually positioned at either of the other three positions provided depending on the performance desired. Assuming that it is desired to drive the automobile forward in the usual manner, the selector switch is placed in the second or "Forward" position. The effect of this positioning of switches is to close an electrical circuit from battery 14 through ignition switch 16, N section of selector switch 18, caterpillar 22, coil 26 of clutch 122 and ground, thereby energizing coil 26. The magnitude of current in this closed circuit is controlled and varied by the resistance of caterpillar 22 which is varied by the position of throttle pedal 50 through linkage 58. As the throttle is increasingly opened, current in clutch coil 26 is increased to increase the coupling between the automobile engine and the load. As a consequence, the rotary speeds of shaft 130 and sun gear 138 are progressively increased whereby planetary gear 150 is rotated about pintle 148. Since one-way brake 160 restricts the motion of ring gear 152 so as to provide a point of pivot for planetary gear 150 under the present circumstances, planetary gear 150 also rotates in an orbital path and drives output shaft 154.

The drive continues under the described gearing until generator 34 is driven with sufficient speed to energize coil 42 and actuate relay B, the most responsive of relay solenoids 42 and 46, through a circuit including modulation reactor 36, rectifier 38, reactor 40, arm 112 of selector switch 18 and coil 42. While solenoid 46 of relay C is also energized, under the circumstances the energization is insufficient to actuate the relay. Actuation of relay B provides energization of brake band solenoid 30 through a circuit including battery 14, contacts C–2 of relay C, contacts B–1 of relay B, solenoid 30 and ground. This effects a communication between a source of vacuum and vacuum chamber 176 through valve 180 to allow atmospheric pressure against the outside of diaphragm 178 to actuate and apply brake 170 through an appropriate linkage to brake the rotary motion of quill 134. Contacts B–2 of relay B closed simultaneously with contacts B–1, shunt one end and an intermediate point of caterpillar 22 to increase the energization of coil 26 to a marked degree. In a manner similar to that described above with respect to first speed, the throttle pedal controls further changes in energization of clutch coil 26 as well as the speed of engine shaft 120. With brake 170 engaged to restrain motion of quill 134, rotation of sun gear 138 causes through gears 150, 146 and 140 a reaction against sun gear 136 as a fixed fulcrum to impart a rotary motion to gears 140, 146, 148, and 152 and necessarily an orbital motion to planetary gears 140 and 148. The race of one-way brake 160 rotates freely under the present circumstances. The gearing is so proportioned as to provide under the present circumstances an increased rotary speed of output shaft 154 over that with first speed gearing.

As a result of increased output speed of shaft 154, generator 34 develops an increased output so as to increase the excitation of solenoid 46 of relay C sufficiently to actuate the same and cause a shift of the transmission to third speed in a manner about to be described. Relay 46 is energized through a closed circuit including "kick-down" switch 44 for a reason to be described. Actuation of relay C opens contacts C-1 and C-2 and closes contacts C-3. Opening of contacts C-1 opens the common return connection for coils 42 and 46 and opening of contacts C-2 is effective to interrupt the circuit of energization of brake band solenoid 30 resulting in disengagement of brake 170 through the introduction of atmosphere into valve 180 and chamber 176 and the consequent operation of suitable linkages in an obvious manner. The closing of contacts C-3 is effective to provide a ground connection to the end of coil 46, of relay C, removed from the common connection to provide a series energization path through coils 42 and 46 by way of battery 14, ignition switch 16, section N of selector switch 18, caterpiller 22, section F-R of switch 18, coil 42, coil 46, contacts C-3 and ground. It should be noted that under the series connection of coils 42 and 46, the current consumption is one-half as great as that of either coil under full voltage.

Energization of coils 42 and 46 and engagement of both clutches 124—126 and 124—128 with the release of brake 170 provides a unitary rotary motion to both shaft 130 and quill 134 resulting in a rotation of all gears 140, 146, 148, and 152 of the transmission as a unit to provide a direct drive from the engine to shaft 154 in the absence of clutch slippage. Housing 144 rotary with gear 152 carries inner race 162 of one-way brake 160 and under the present circumstances inner race 162 rotates in its unrestrained direction.

As explained hereinabove, excitation of coil 46 of relay C is through a circuit including kick-down switch 44. In explaining the function and purpose of switch 44, it is assumed that in operating the automobile there is a demand for a momentary burst of power as occurs, for example, when passing other automobiles or ascending a steep incline. The operator need only depress the throttle pedal 50 as far as possible and switch 44 is opened by the rod 58 to interrupt the circuit of coil 46 to effect a closure of relay C and to provide conditions for second speed operation and consequently effect a shift to second speed. A higher torque is consequently delivered to drive shaft 154. It should be noted, however, that at speeds above a certain relatively high speed no benefit may be obtained from a shift from third to second speed and a shift down is accordingly to be prevented by opening of the kickdown switch. To effect such a result, by-pass resistor 48 connected across switch 44 is of such value that at such higher speeds it allows sufficient current from generator 34 to flow therethrough so as to maintain coil 46 energized and relay C actuated notwithstanding the condition of switch 44. Consequently no shift results from the opening of switch 44. Resistor 48 is adjustable for selection of one of a range of speeds above which kickdown switch 44 may be rendered ineffectual.

It is next assumed that it is desired to operate the automobile from a standstill in a reverse direction. The selector switch is placed in its third or "reverse" position the effect of which is to provide a circuit connection from battery 14 through ignition switch 16, caterpillar 22, arm 114 of section F-R of selector switch 18, clutch coil 46 and ground. Simultaneously therewith arm 186 of selector lever actuates a bell crank 190 so as to move pawl 182 into engagement with the teeth 183 on housing 144 to lock the same into position. The effect of engagement of clutch 124—128 is to drive quill 134 and sun gear 136 in a rotary, clockwise motion when observing the same from the left or engine end thereof. Planetary gear 140 on locked pintle 142 now rotates in a counterclockwise manner and ring gear 146 accordingly also rotates in a counterclockwise manner effecting a counterclockwise rotation of shaft 154 through the coupling between gear 146 and shaft 154 since planetary gear 150 and sun gear 138 now float.

As an additional feature of the present invention an arrangement is provided for rocking the automobile for the purpose of extricating it from mud holes, snow and the like. The selector switch 18 has a fourth or forward position provided, enabling energization of coil 42 of clutch 124—126 to facilitate forward drive of shaft 154. Forward drive under the circumstances is the same as forward drive in the second position of selector switch 18 with the exception that housing 144 is blocked from rotation by pawl 182 which is engaged in the fourth position of selector switch 18, rather than one-way brake 160 as in first position of switch 18. The selector switch is readily and easily manipulated from third or reverse position to fourth or forward position by a slight pressure on the selector lever. By movement of the selector lever forward and backward, a quick change from forward to reverse drive of the automobile which in many cases is very desirable in driving.

Another feature of the present invention in all speeds of travel is the acceleration modulator. Variation in throttle causes movement of magnetic core 56 into or out of solenoid 36 by means of an appropriate linkage. The effect of the movement of core 56 is to vary the inductance of coil 36 and consequently its inductive reactance so as to provide a control of current delivered by generator 34 to relay coils 42 and 46. It is noted, for example, that at a certain speed of shaft 154, the relays B and C will be actuated more readily at light throttle than at heavy throttle. In other words, the effect of the modulator is to delay shifting of the transmission under conditions of heavy load and to enable shifting quicker under light load conditions, a desirable situation for obtaining optimum gearing.

It is readily apparent to those skilled in the art that the present invention is admirably suited for accomplishing the objects of the present invention in a desirably simple and effective manner resulting in ease of construction and maintenance of the present system.

While the present invention has been described with respect to a certain specific embodiment, the same is exemplary only and many changes and modifications may readily be made without departing from the scope or spirit of the present invention. Applicant accordingly, intends to cover all such modifications and changes in the appended claims and is to be limited only thereby.

What I claim is:

1. In a control system for an automatic transmission, an input shaft adapted to be coupled to an engine, an output shaft and an engine speed control means, said transmission being interposed between said input shaft and said output shaft to provide a coupling therebetween, and including a pair of intermediate shafts selectively driven by said input shaft, planetary gearing means connected between said intermediate shafts and said output shaft, break means operative to fix an element of said planetary gearing means from rotation and energizable clutches selectively connecting said input shaft and said intermediate shafts, means coupled to said output shaft for producing a signal proportional in magnitude to the rotary speed of said shaft, means coupled to said engine speed control means and operatively connected to said signal producing means for varying the magnitude of said signal inversely as the speed designation of said speed control means, and further means operatively connected with said last-mentioned means, said brake means, said clutches and responsive to said varied signal for controlling the energization of said clutches and brake to provide optimum torsional drive between said input and said output shafts.

2. In a control system according to claim 1 wherein said means for varying said signal comprises an inductor interposed in the circuit of said signal producer, a high permeability core and a linkage from said core to said speed control means for placing said core in closer proximity to said inductor in response to increased speed designations of said speed control means, whereby the reactance of said inductor is increased, said signal diminished and the shifting of said transmission delayed for increased load conditions.

3. In a control circuit for an automatic transmission comprising an input shaft, a pair of intermediate shafts, an output shaft and a throttle control for a power source, multiple clutch means to selectively connect said input shaft and said intermediate shafts, a gear mechanism including one-way brake means interposed between said intermediate shafts and said output shaft, brake means selectively controlling said gear mechanism, voltage generating means having an output circuit and coupled to said output shaft to provide an output proportional to the speed of said shaft, circuit means including a pair of relays having coils and being operatively connected with said clutch means, one of said coils being connected in said output circuit of said generating means, switch means, the other of said coils being connected in said output circuit of said generating means through said switch means, said switch means being actuable by said throttle control to affect the actuation of one of said relays, said clutch means and said brake means being controlled by said relays to effect gearing changes in said gear mechanism to provide an automatically shiftable transmission.

4. In a control circuit for an automatic transmission comprising a pair of clutch means, a pair of planetary units driven respectively by said pair of clutch means, brake means operable to control one of said planetary units, automatically operable brake means to control the other of said planetary units, an output shaft, said clutch means and said planetary units being interposed between a power source and said shaft, circuit control means comprising a pair of relays operatively connected with and responsive to the energization of means which is responsive to the speed of said output shaft, switch means operatively connected with said relays, said pair of clutch means and said brake means to control said planetary units whereby said output shaft is selectively driven in either of two directions, said switch means being actuable to control in one position to provide reverse drive of said output shaft and in two positions to provide forward drive of said output shaft, said switch means being actuable for rapid change from said position for reverse drive to one of said positions for forward drive.

5. A control circuit for a transmission having a driving member, a pair of input shafts, energizable clutch means to selectively couple said input shafts to said driving member, an output member, brake means operative to brake one of said input shafts, gearing means operatively connected to said input shafts and said output member, means operatively connected with and responsive to the speed of said output member for developing an electrical signal proportional in magnitude to the speed of said output member, circuit means including a pair of relays operatively connected with said last mentioned means and responsive to different magnitudes of said signal, means operatively connected with and actuated by said relays and operatively connected with said clutches and said brake for sequentially engaging said clutches and said brake to control said gearing, whereby a transmission, shiftable automatically in response to variations in speed of said output member, is provided.

6. In a control circuit having a multi-speed transmission coupled between an engine and a load having an output shaft, a pair of input shafts, a single input member, variably energizable means selectively coupling said input shafts with said single input member, at least a pair of planetary gear sets each including a sun gear connected respectively to each of said input shafts, further elements of said planetary gear sets being operatively connected to said output shaft and the remaining elements of said planetary gear sets being in meshing engagement with said sun gears and said further elements, one-way brake means to prevent reverse rotation of said remaining elements, means controlling the coupling between said input member and said input shafts, brake means controlling the rotation of one of said sun gears, speed responsive means developing a signal proportional in magnitude to the speed of said output shaft, engine speed control means, means operably connected with said speed responsive and said engine speed control means for modulating said signal so as to diminish same at increased load, a plurality of relays operatively connected with said speed responsive means and said last mentioned means and responsive to different magnitudes of said signal for sequentially operating said selective coupling means and said brake means, means connected to said engine speed control means and said variably energizable means to vary the degree of coupling between said input member and said input shafts in accordance with the position of said engine speed control means, whereby a plural speed automatically shiftable transmission is provided.

References Cited in the file of this patent

UNITED STATES PATENTS

| | | |
|---|---|---|
| 2,176,138 | Kelley | Oct. 17, 1939 |
| 2,467,874 | Winther et al. | Apr. 19, 1949 |
| 2,489,725 | Rutemiller | Nov. 29, 1949 |
| 2,548,756 | Winther | Apr. 10, 1951 |
| 2,658,403 | Marco | Nov. 10, 1953 |